(12) United States Patent
Garcia et al.

(10) Patent No.: US 8,671,664 B2
(45) Date of Patent: Mar. 18, 2014

(54) SYSTEM FOR PURGING A DEVICE

(75) Inventors: Gary Garcia, Geneva, NY (US); Rob Gardner, Newark, NY (US); Bill Crane, Palmyra, NY (US); Jeff Tyler, Newark, NY (US)

(73) Assignee: G.W. Lisk Company, Inc., Clifton Springs, NY (US)

( * ) Notice: Subject to any disclaimer, the term of this patent is extended or adjusted under 35 U.S.C. 154(b) by 355 days.

(21) Appl. No.: 12/988,042

(22) PCT Filed: Feb. 25, 2009

(86) PCT No.: PCT/US2009/035066
§ 371 (c)(1),
(2), (4) Date: Oct. 15, 2010

(87) PCT Pub. No.: WO2009/128985
PCT Pub. Date: Oct. 22, 2009

(65) Prior Publication Data
US 2011/0030334 A1    Feb. 10, 2011

Related U.S. Application Data (60) Provisional application No. 61/045,032, filed on Apr. 15, 2008.

(51) Int. Cl.
*F01N 3/00*    (2006.01)
(52) U.S. Cl.
USPC ............. 60/286; 60/289; 60/293; 60/295
(58) Field of Classification Search
USPC .................................. 60/274–324
See application file for complete search history.

(56) References Cited

U.S. PATENT DOCUMENTS

| | | | | |
|---|---|---|---|---|
| 5,884,475 A | * | 3/1999 | Hofmann et al. | 60/274 |
| 6,041,594 A | * | 3/2000 | Brenner et al. | 60/309 |
| 6,273,120 B1 | * | 8/2001 | Hofmann et al. | 137/98 |
| 6,892,544 B2 | | 5/2005 | Futa, Jr. et al. | |

(Continued)

FOREIGN PATENT DOCUMENTS

| | | |
|---|---|---|
| JP | 57093651 | 6/1982 |
| JP | 60164627 | 8/1985 |

(Continued)

OTHER PUBLICATIONS

PCT Search Report; PCT/US2009/035066; Sep. 21, 2009, 10 pages.

*Primary Examiner* — Jesse Bogue
(74) *Attorney, Agent, or Firm* — Brown & Michaels, PC (57) ABSTRACT

A system for purging a device for injecting fuel into an exhaust system of an engine comprising a device having an input and an output coupled to an exhaust system, at least one air valve and at least one fuel valve. The air valve has an input an input coupled to an air supply and an output coupled to the device through a check valve. The fuel valve has an input coupled to a fuel supply and an output coupled to the device through a check valve. When the air valve is open and the fuel valve is closed, air flows from the air supply to the device and is injected into the exhaust system of the engine. When the air valve is closed and the fuel valve is open, fuel flows from the fuel supply to the device and is injected into the exhaust system of the engine.

7 Claims, 12 Drawing Sheets

(56) References Cited

U.S. PATENT DOCUMENTS

| | | |
|---|---|---|
| 7,337,607 B2 * | 3/2008 | Hou et al. .................. 60/274 |
| 7,383,826 B2 | 6/2008 | Kano et al. |
| 7,775,036 B2 * | 8/2010 | Barcin ...................... 60/286 |
| 7,874,148 B2 * | 1/2011 | Duffield ..................... 60/297 |
| 7,937,934 B2 * | 5/2011 | Plougmann ................. 60/286 |
| 2008/0022660 A1 | 1/2008 | Reuter et al. |
| 2008/0022668 A1 * | 1/2008 | Bugos et al. ................ 60/295 |
| 2008/0034734 A1 | 2/2008 | Karkkainen et al. |
| 2008/0138215 A1 * | 6/2008 | Jochumsen et al. .......... 417/307 |
| 2011/0016854 A1 * | 1/2011 | Gaudin et al. ............... 60/299 |
| 2011/0203257 A1 * | 8/2011 | White et al. ................ 60/274 |

FOREIGN PATENT DOCUMENTS

| | | |
|---|---|---|
| JP | 2000088236 | 3/2000 |
| JP | 2007016622 | 1/2007 |
| JP | 2007187011 | 7/2007 |

* cited by examiner

SYSTEM FOR PURGING A DEVICE

REFERENCE TO RELATED APPLICATIONS

This application claims one or more inventions which were disclosed in Provisional Application No. 61/045,032, filed Apr. 15, 2008, entitled "DOSER AIR PURGE". The benefit under 35 USC §119(e) of the United States provisional application is hereby claimed, and the aforementioned application is hereby incorporated herein by reference.

BACKGROUND OF THE INVENTION

1. Field of the Invention

The invention pertains to the field of exhaust systems. More particularly, the invention pertains to an exhaust system with air purging.

2. Description of Related Art

Doser valves are used to inject fuel into the exhaust system of diesel engines to burn particulate matter in a filter and thus clean them out. Therefore, they are mounted on the "hot" side of the engine in the exhaust system. Due to the very high temperatures within the exhaust system on the "hot" side of the engine, the PWM operating mode, and the necessary valve seat materials used, minute leakage of the doser valve occurs. This leakage may promote fuel to coke and clog the spray orifice of the doser valve compromising specific spray patterns, decreasing the efficiency of the filter cleaning process and of the engine.

SUMMARY

A system for purging a device for injecting fuel into an exhaust system of an engine comprising a device having an input and an output coupled to an exhaust system, at least one air valve and at least one fuel valve. The air valve has an input an input coupled to an air supply and an output coupled to the device through a check valve. The fuel valve has an input coupled to a fuel supply and an output coupled to the device through a check valve. When the air valve is open and the fuel valve is closed, air flows from the air supply to the device and is injected into the exhaust system of the engine. When the air valve is closed and the fuel valve is open, fuel flows from the fuel supply to the device and is injected into the exhaust system of the engine.

In an alternate embodiment, the fuel valve and air valve are combined into a single two position valve. When the single two position valve is in a first position, the air valve portion of the single two position valve is open and the fuel valve portion is closed, air flows from the air supply to the device and is injected into the exhaust system of the engine. When the single two position valve is in a second position, the air valve portion of the valve is closed and the fuel valve portion of the valve is open, fuel flows from the fuel supply to the device and is injected into the exhaust system of the engine. The single two position valve also has a transitional position in which the air valve portion and the fuel valve portion are closed and neither fuel or air flows to the device (closed cross over).

In another embodiment, the air valve is comprised of a first air valve and second air valve whose positions are controlled by a pilot air control valve. The output of the first air valve is the input of the second air valve and volume is coupled to the output of the first air valve and the input of the second air valve. The pilot air control valve has an input coupled to the air supply and an output coupled to the fuel valve, the first air valve, and the second air valve. When the pilot air control valve is open, the air flows to and actuates the first air valve, second air valve, and fuel valve.

When the pilot air control valve is closed, the first air valve is closed, the second air valve is open and the fuel valve is closed, air from the volume flows to the device and is injected into the exhaust system of the engine.

When the pilot air control valve is open, the first air valve is open, the second air valve is closed, and the fuel valve is open, air from the air supply flows into the volume, and fuel flows from the fuel supply to the device and is injected into the exhaust system of the engine.

DETAILED DESCRIPTION OF THE INVENTION

Figure 1:
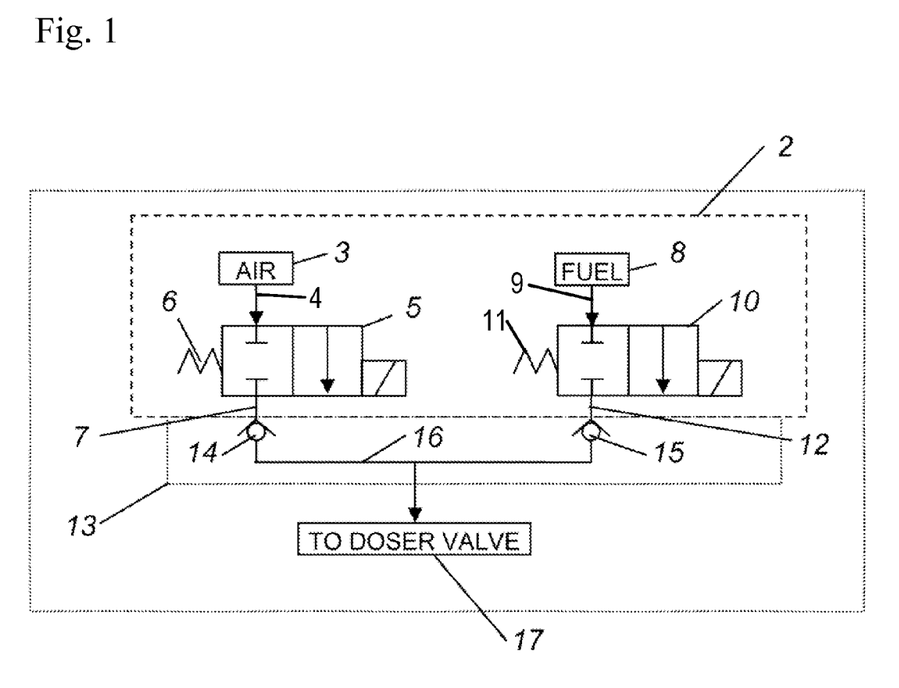
FIG. 1 shows a schematic of an exhaust after-treatment dosing system of the first embodiment of the present invention.

FIG. 1 shows an exhaust after-treatment dosing system of a first embodiment. The exhaust after-treatment dosing systems include a valve assembly 2, a check valve assembly 13, and a device for injecting fuel into an exhaust system, for example a doser valve 17. The check valve assembly 13 is preferably installed as close to the inlet of the doser valve 17 as possible. An advantage of having the check valve assembly 13 near the doser valve 17 is that the line 18 to the doser valve 17 is short and only a minimum amount of fuel needs to be purged from the line. The air and fuel valve assembly 2 is located upstream of the check valve 13 assembly. Dual lines 7, 12 are used between the valve assembly 2 and the check valve assembly 13 as shown in FIGS. 5-9. It should be noted that while only two valves (one for air and one for fuel) are shown in FIGS. 5-9, multiple valves may be present.

A supply of air 3 is provided to a solenoid controlled on/off air valve 5 within the valve assembly through line 4. When the solenoid controlled air valve 5 is turned on, or the solenoid is energized, the air valve 5 is moved to a position such that air may pass through the air valve 5 to line 7 leading to the check valve assembly 13 and the doser valve 17. When the solenoid is de-energized, a spring 6 biases the air valve 5 to a position where the air from line 4 is blocked and prevented from entering line 7 leading to the check valve assembly 13. The pressure of the air supply may be regulated.

Regulated fuel 8 is supplied to a solenoid controlled on/off fuel valve 10 within the valve assembly through line 9. When the solenoid controlled fuel valve 10 is turned on, or the solenoid is energized, the fuel valve 10 is moved to a position such that fuel may pass through the fuel valve 10 to line 12 leading to the check valve assembly 13 and the doser valve 17. When the solenoid is de-energized, a spring 11 biases the fuel valve 10 to a position where the regulated fuel from line 9 is blocked and prevented from entering line 12 leading to the check valve assembly 13.

The check valve assembly 13 includes a first check valve 14 and a second check valve 15 each leading to line 16 leading and the doser valve 17. The check valves 14 and 15 prevent air from moving into fuel line 12 and fuel from moving into air line 7. The check valve assembly 13 may be present close to the doser valve or in the valve assembly.

The air valve 5 and fuel valve 10 are controlled by the ECU and both valves preferably have low internal leakage.

The doser valve 17 is any prior art doser valve.

Figure 2A:
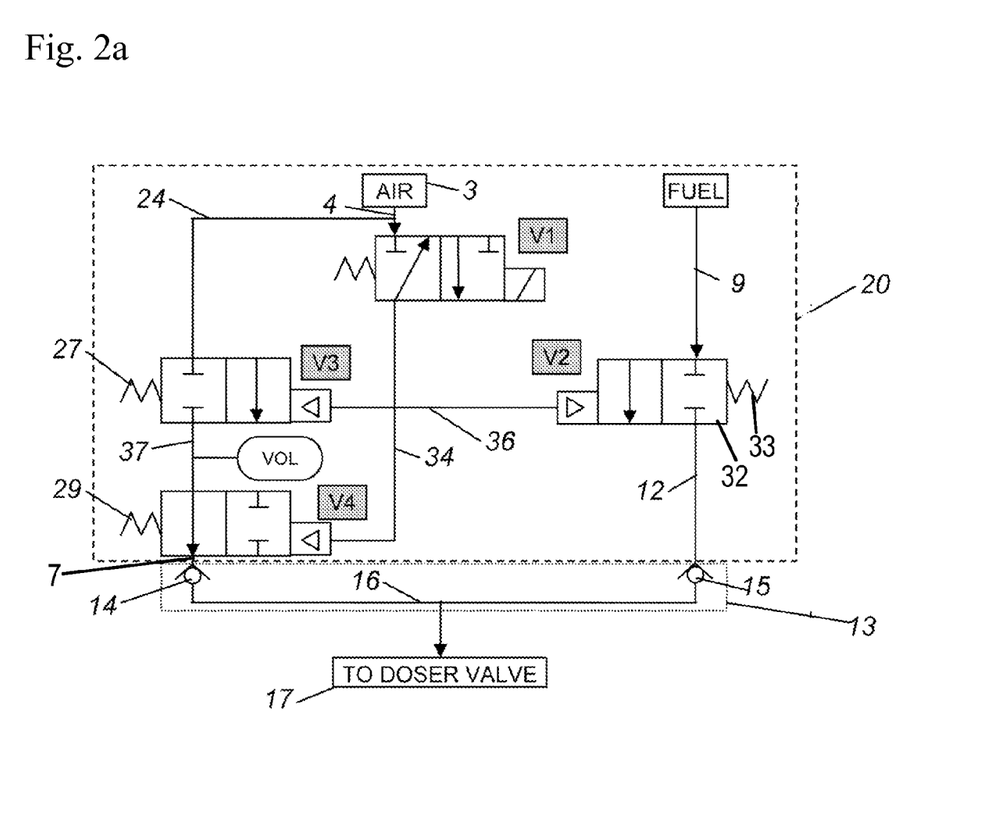
FIG. 2a shows a schematic of an exhaust after-treatment dosing system of the second embodiment of the present invention with air purging the doser valve.
Figure 2B:
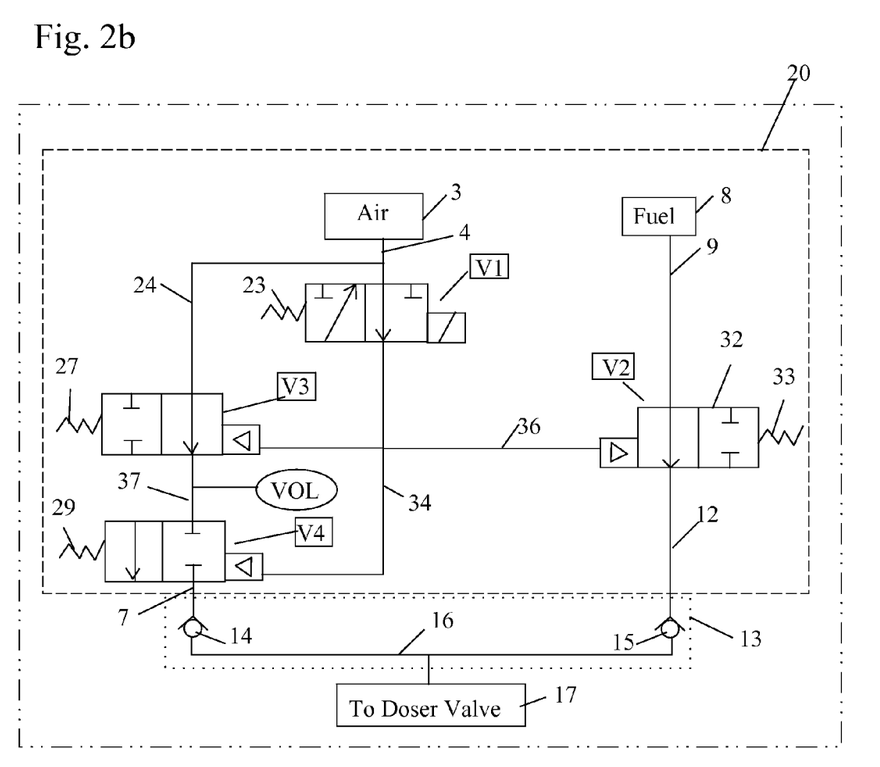
FIG. 2b shows a schematic of an exhaust after-treatment dosing system of the second embodiment of the present invention with fuel entering doser valve.

FIGS. 2a and 2b show exhaust after-treatment dosing system of a second embodiment. The exhaust after-treatment dosing system includes a valve assembly 20, a check valve assembly 13, and a device for injecting fuel into an exhaust system, preferably a doser valve 17. The valve assembly 20 is located upstream of the check valve 13 assembly. The check valve assembly 13 is preferably installed as close to the inlet of the doser valve as possible. An advantage of having the check valve assembly 13 near the doser valve 17 is that the line 18 leading to the doser valve is short and only a minimum amount of fuel needs to be purged from the line. Dual lines 7, 12 are used between the valve assembly 20 and the check valve assembly 13 as shown in FIGS. 5-9. It should be noted that while only two valves (one for air and one for fuel) are shown in FIGS. 5-9, multiple valves may be present as shown in FIGS. 2a and 2b.

A supply of air 3 is supplied to a solenoid controlled three way air control valve V1 through line 4. The three way air control valve V1 controls the air pressure to a fuel valve V2, as well as to two other air valves V3, V4.

The first air valve V3 and the second air valve V4 have two positions. In a first or default position of the first air valve V3, air from line 24, which is connected to line 4 and the air supply 3, is blocked from moving through the first air valve V3. In a second position of the first air valve V3, air from line 24 may pass through the air valve V3 and into a finite volume VOL.

In a first or default position of the second air valve V4, air from finite volume VOL may move through the second air valve V4 to line 7 leading to the check valve assembly 13 and the doser valve 17. In a second position, air from the finite volume VOL is blocked from moving into line 7 leading to the check valve assembly 13 and the doser valve 17.

A supply of fuel 8 is supplied to a fuel valve 32 or V2 through line 9. The fuel valve V2 is moved from a first position to a second position by air pressure in line 36. When air pressure is not present, spring 33 moves the fuel valve V2 to a first or default position where fuel is blocked from enter line 12 leading to the check valve assembly 13 and the doser valve 17. When air pressure is present, the fuel valve V2 is moved to a second position where fuel moves from line 9, through the valve to line 12 leading to the check valve assembly 13 and the doser valve 17.

If the three way air control valve V1 is in a position where air is blocked from line 4 from entering line 34 and 36, connecting the air valves V3, V4 and the fuel valve V2 together, then all of the valves are biased by springs 27, 29, 33 to their first position or default position and any air in lines 34 and 36 is vented to atmosphere.

Referring to FIG. 2a, at the end of a dosing cycle, the solenoid controlled three way air control valve V1 is de-energized, and the spring 23 biases the air control valve V1 to a position where regulated air in line 4 is blocked from entering lines 34 and 36 leading to the fuel valve V2, the first air valve V3 and the second air valve V4, and lines 34 and 36 are vented to atmosphere. Without the air pressure, the first air valve V3 is spring 27 biased to the first or default position blocking the air from line 24. The second air valve V4 is moved to the first or default position allowing air present in the finite volume VOL to discharge its air through the second air valve V4 and into line 7 leading to the check valve assembly 13 and the doser valve 17. Air from the finite volume VOL will continue to dispense into line 7 through the check valve assembly 13 and into the doser valve 17 until the finite volume VOL is empty or the doser valve 17 is de-energized.

When the solenoid controlled three way air control valve V1 is energized, the valve V1 is moved to a position where air is provided to the fuel valve V2 and the first and second air valves V3, V4 as shown in FIG. 2b. The force of the air is greater than the spring force of springs 27, 29 on the first and second air valves V3, V4 and move the first and second air valves V3, V4 to their second positions. With the air valves in their second positions, air from line 24 may pass through the first air valve V3 to line 37, pressurizing the finite volume VOL, but is blocked by the second air valve V4 from entering the check valve assembly 13 and the doser valve 17. At the same time, the fuel from line 9 may pass through the fuel valve V2 leading to line 12 and the check valve assembly 13 and doser valve 17.

The check valve assembly 13 includes a first check valve 14 and a line 16 leading to the doser valve 17 and a second check valve 15 and a line 16 leading to the doser valve 17. The check valves 14 and 15 prevent air from moving into fuel line 12 and fuel from moving into air line 7, respectively. The check valve assembly 13 may be present close to the doser valve 17 as shown on the "hot" side of the engine or in the valve block on the "cold" side of the engine that houses the valves 5, 10.

The three way air control valve V1 is controlled by the ECU, the only electrical interface being used with this system to dispense a controlled volume of air for purging fuel from the inlet line to the doser valve. These features simplify installation and conserve air.

Figure 3:
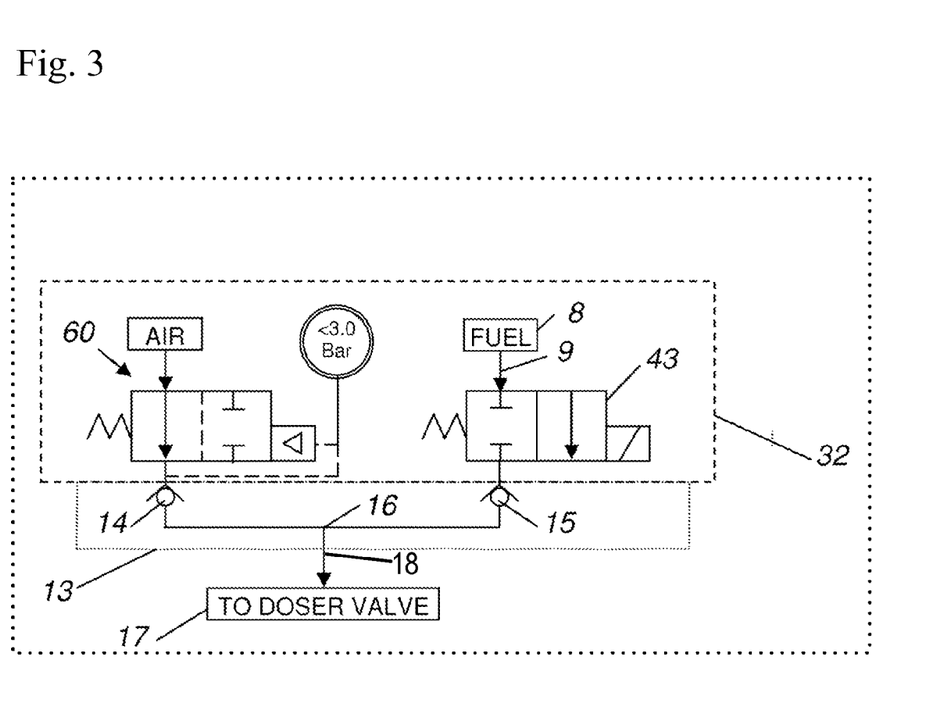
FIG. 3 shows a schematic of an exhaust after-treatment dosing system of the third embodiment of the present invention.

FIG. 3 shows an exhaust after-treatment dosing system of a third embodiment. The exhaust after-treatment dosing system includes a valve assembly 32 with a pressure regulator 60 and a fuel valve 43, a check valve assembly 13, and a device for injecting fuel into the exhaust system, for example a doser valve 17. The check valve assembly 13 may be built into the inlet of the doser valve 17. An advantage of having the check valve assembly 13 near the doser valve 17 is that the line 18 leading to the doser valve 17 is short and only a minimum amount of fuel needs to be purged from the line. The pressure regulator 60 and fuel valve 43 are located upstream of the check valve 13 assembly. Dual lines 7, 12 are used between the pressure regulator 60 and fuel valve 43 and the check valve assembly 13 similar to FIGS. 5-9.

Fuel 8 is supplied to a solenoid controlled on/off fuel valve 43 through line 9. When the solenoid is energized, the fuel valve 43 is moved to a position such that fuel may pass through the fuel valve 43 to line 12 leading to the check valve assembly 13 and the doser valve 17. When the solenoid is de-energized, a spring 44 biases the fuel valve 43 to a position where the regulated fuel from line 9 is blocked and prevented from entering line 12 leading to the check valve assembly 13.

Figure 7:
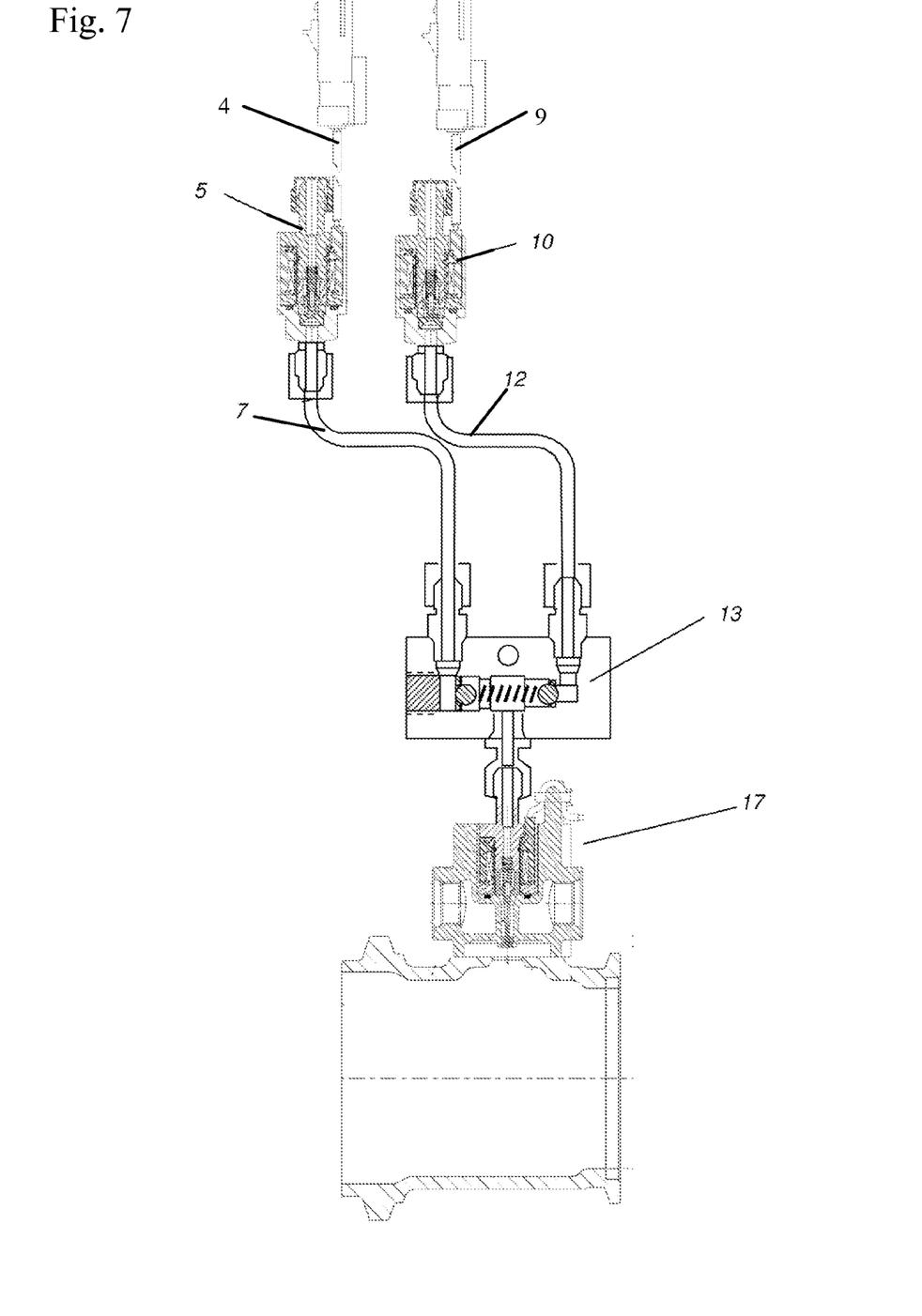
FIG. 7 shows a schematic of a cross-section of FIG. 6.
Figure 8:
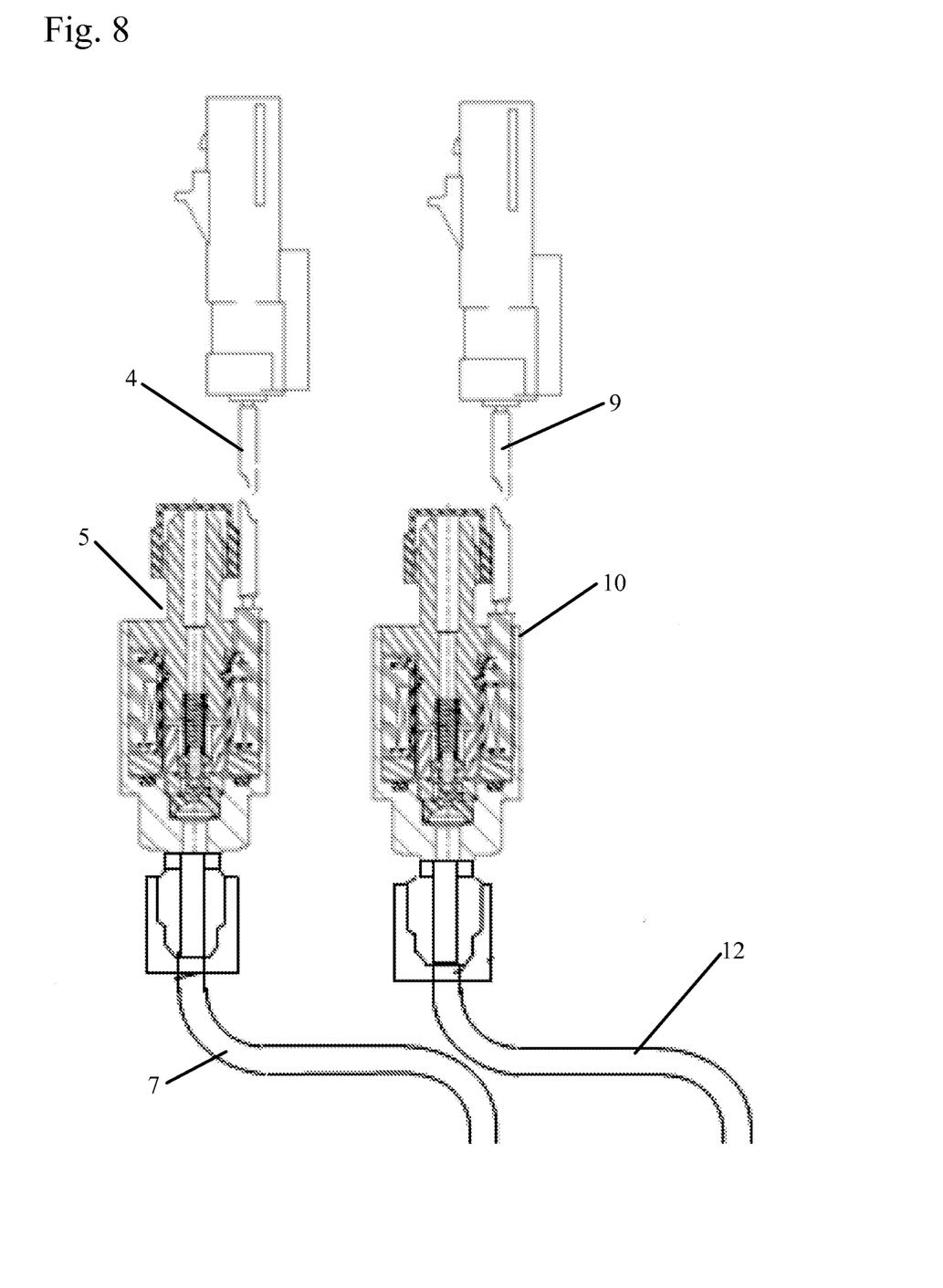
FIG. 8 shows a cross-section of the shut off valves of FIGS. 5 and 6.
Figure 9:
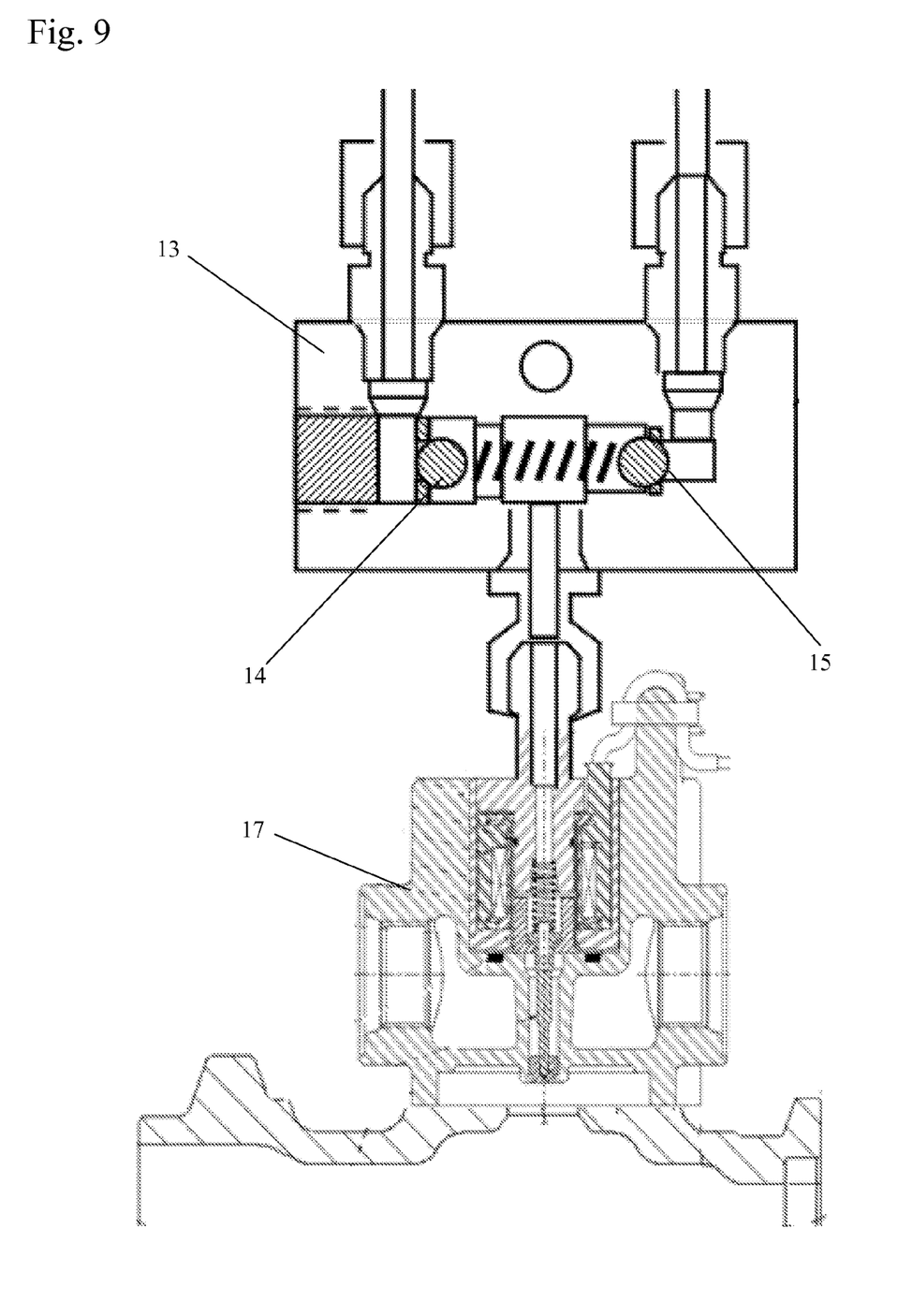
FIG. 9 shows a cross-section of the check valve assembly interface with the doser valve of FIGS. 5 and 6.

An air pressure regulator 60 provides a low pressure preset continuous air pressure to the check valve assembly 13 and the doser valve 17. The constant air pressure supplied to the doser valve 17 minimizes coking of the outlet orifice as shown in FIGS. 7 and 9. The continuous air pressure supplied by the air pressure regulator 60 is generally less than the fuel system pressure and is shown as less than 3.0 Bar, although other pressures may be used.

The check valve assembly 13 includes a first check valve 14 and a line 16 leading to the doser valve 17 and a second check valve 15 and a line 16 leading to the doser valve 17. The check valves 14 and 15 prevent air from moving into fuel line 12 and fuel from moving into air line 7. The check valve assembly 13 may be present close to the doser valve or in the valve assembly 32.

When the fuel valve 43 is moved to a position such that fuel may pass through the fuel valve 43 to line 12 leading to the check valve assembly 13 and the doser valve 17, the fuel pressure will hold check valve 14 closed, blocking air flow. Once the fuel valve 43 is de-energized, blocking the flow of fuel to the check valve assembly 13, continuous air pressure is applied to the doser valve 17.

Figure 4:
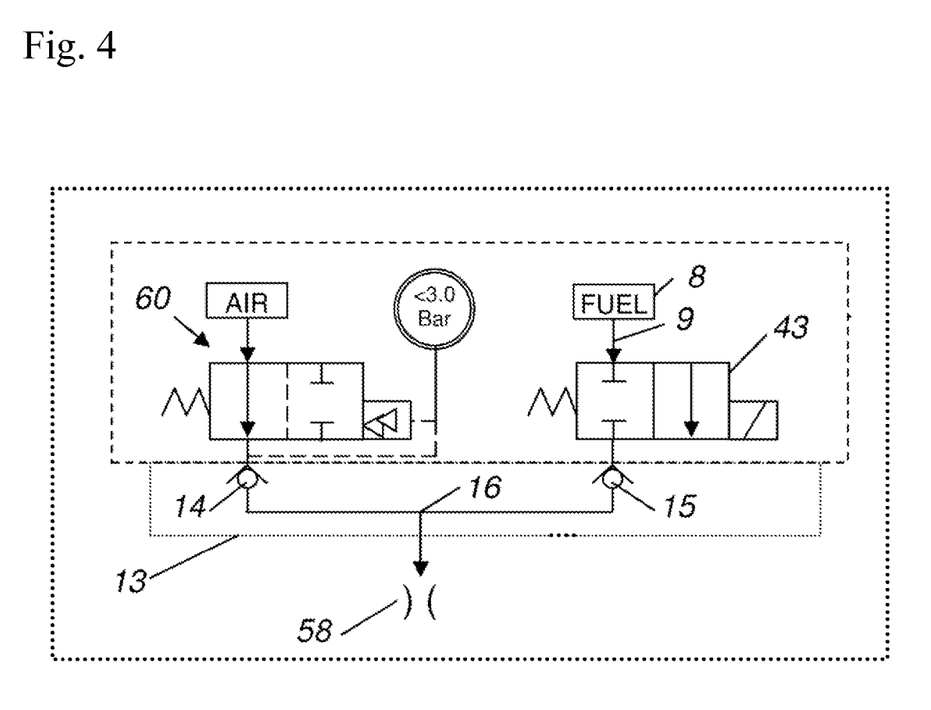
FIG. 4 shows a schematic of an exhaust after-treatment dosing system of the fourth embodiment of the present invention.
Figure 5:
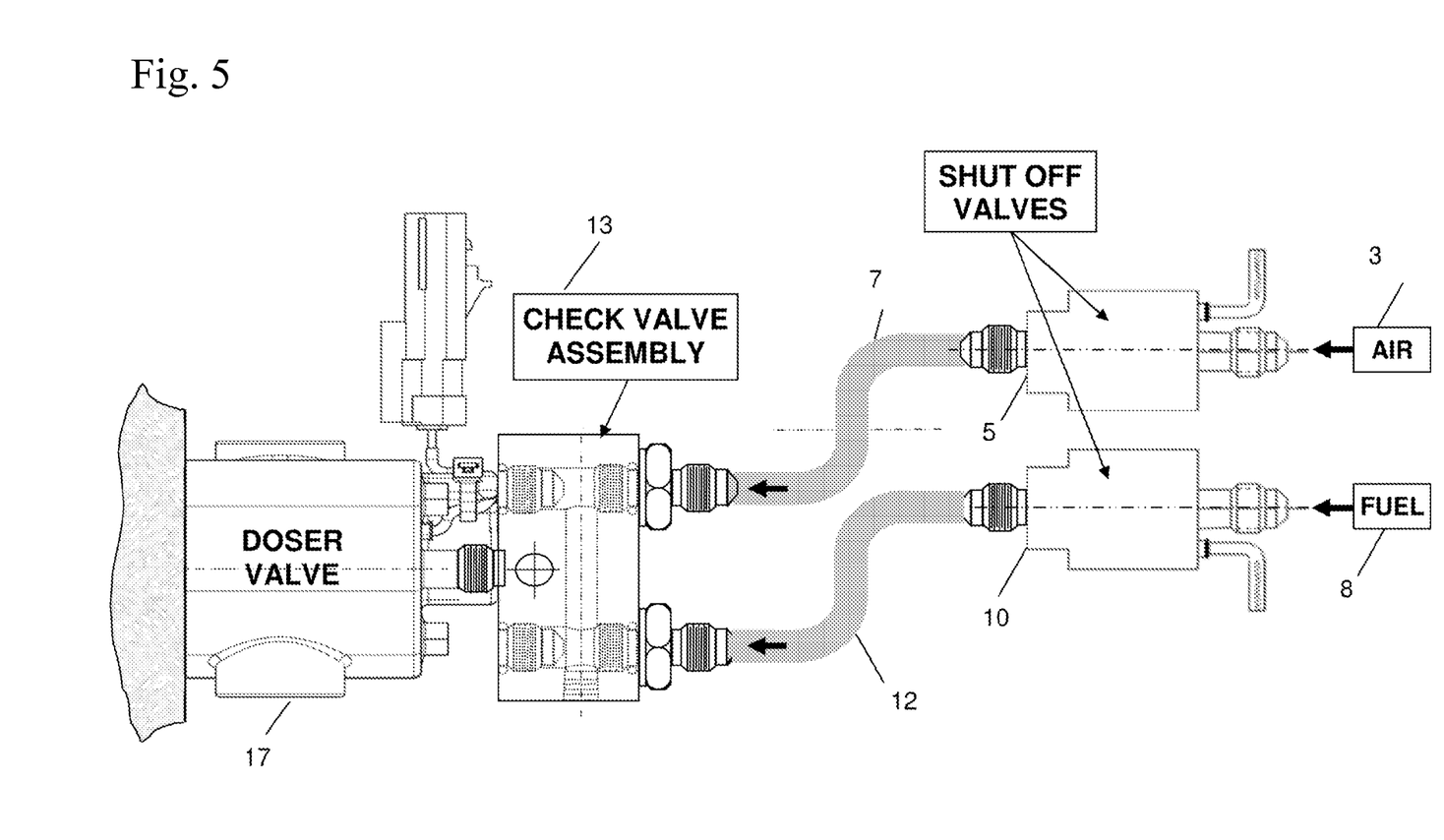
FIG. 5 shows a schematic of exhaust after-treatment dosing system with dual lines.
Figure 6:
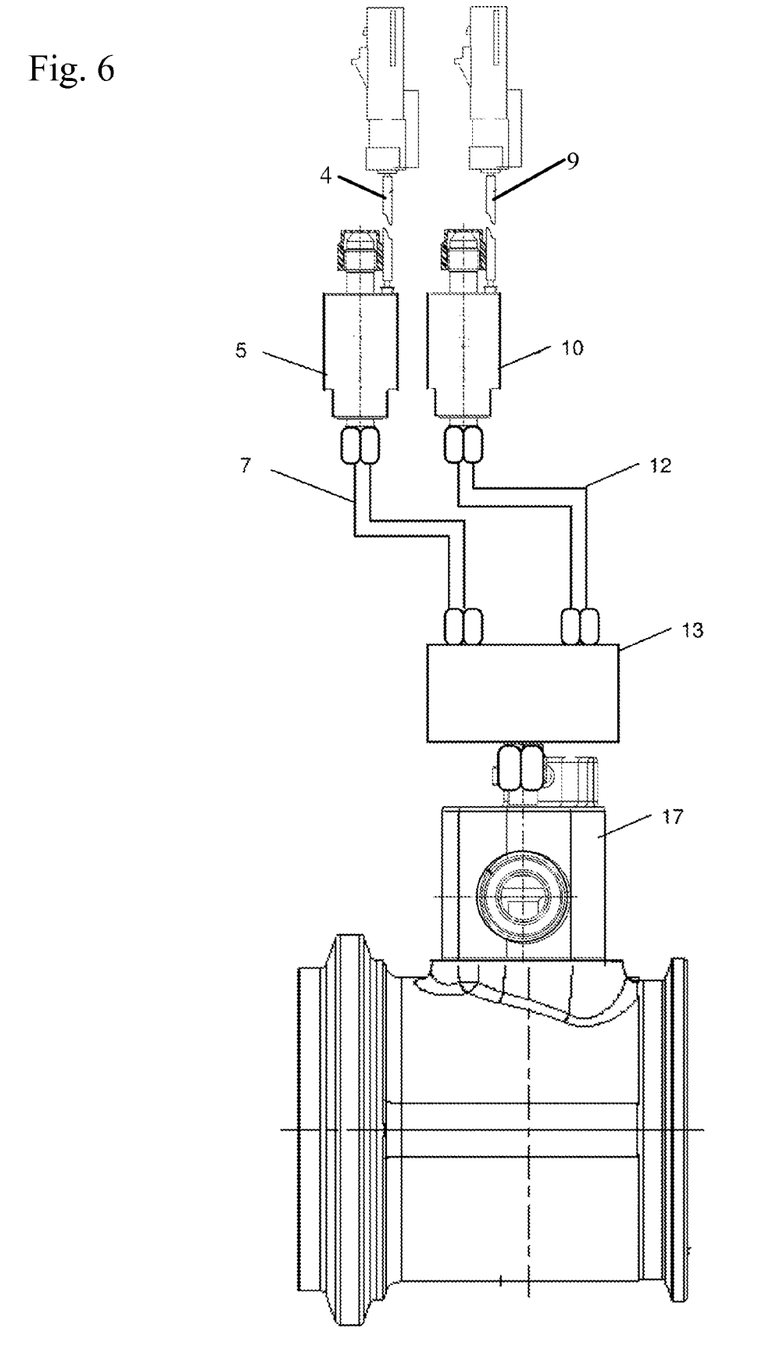
FIG. 6 shows a schematic of exhaust after-treatment dosing system mounted on the exhaust tube.

FIG. 4 shows an exhaust after-treatment dosing system of a fourth embodiment. The exhaust after-treatment dosing systems include a valve assembly 32 with a pressure regulator 60 and a fuel valve 43, a check valve assembly 13, and device for injecting fuel into an exhaust system, for example, single or multiple orifices 58 of a nozzle (not shown) that creates desired spray plume and atomization of fuel. A doser valve (not shown) is also present upstream to control the fuel supply to the orifice(s) of the nozzle. The check valve assembly 13 may be located near the orifices of the nozzle. An advantage of having the check valve assembly 13 near the orifices is that the line 18 leading to the doser valve 17 is short and only a minimum amount of fuel needs to be purged from the line. The pressure regulator 60 and fuel valve 43 are located upstream of the check valve 13 assembly. Dual lines 7, 12 are used between the pressure regulator 60 and fuel valve 43 and the check valve assembly 13 similar to FIGS. 5-9.

Fuel 8 is supplied to a solenoid controlled on/off fuel valve 43 through line 9. When the solenoid of the fuel valve 43 is energized, the fuel valve 43 is moved to a position such that fuel may pass through the fuel valve 43 to line 12 leading to the check valve assembly 13 and the orifice(s) 58. When the solenoid is de-energized, a spring 44 biases the fuel valve 43 to a position where the regulated fuel from line 9 is blocked and prevented from entering line 12 leading to the check valve assembly 13.

An air pressure regulator 60 provides a low pressure preset continuous air pressure to the check valve assembly and the orifice(s). The constant air pressure supplied to the orifice(s) minimizes coking of the outlet orifice (s). The continuous air pressure supplied by the air pressure regulator 60 is less than the fuel system pressure and is shown as less than 3.0 Bar, although other pressures may be used.

The check valve assembly 13 includes a first check valve 14 and a line 16 leading to orifice(s) of a nozzle and a second check valve 15 and a line 16 leading to orifice(s) of a nozzle. The check valves 14 and 15 prevent air from moving into fuel line 12 and fuel from moving into air line 7. The check valve assembly 13 may be present close to the nozzle or in the valve assembly 32.

When the fuel valve 43 is moved to a position such that fuel may pass through the fuel valve 43 to line 12 leading to the check valve assembly 13 and the orifices of the nozzle, the fuel pressure will hold check valve 14 closed, blocking air flow. Once the fuel valve 43 is de-energized, blocking the flow of fuel to the check valve assembly, continuous air pressure is applied to the orifice(s) of the nozzle.

Figure 10A:
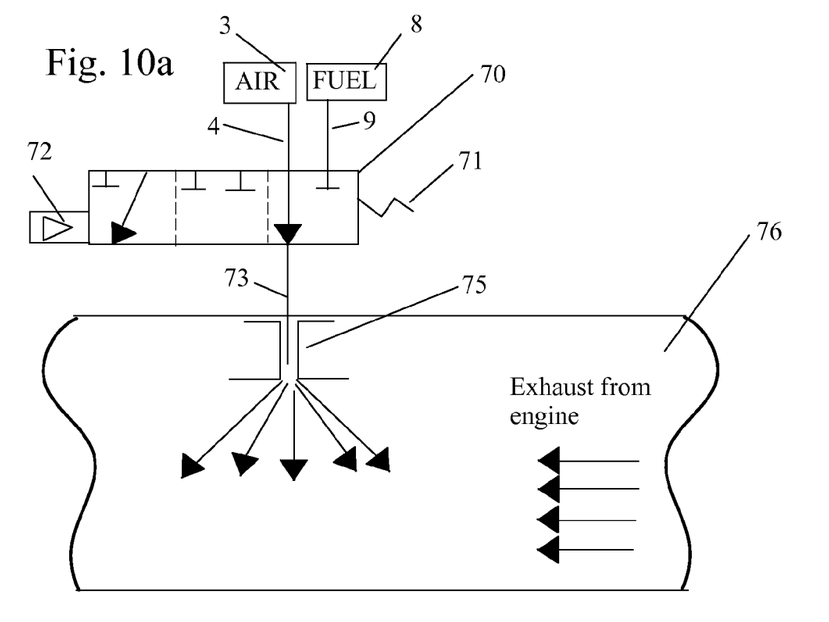
FIG. 10a-10c show schematics of an exhaust after-treatment dosing system integrated into an injector or remotely mounted in the engine with the use of a line between the valve and an injector nozzle
Figure 10B:
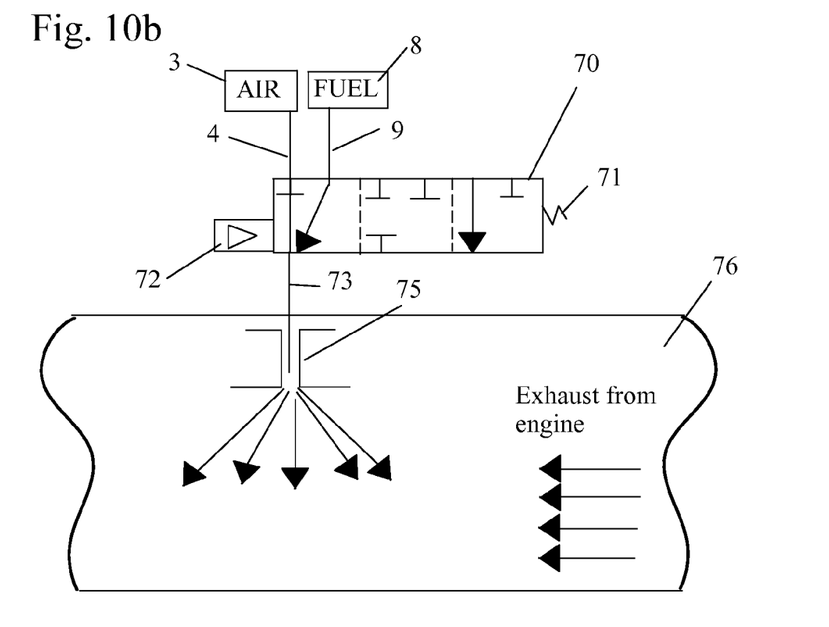
Figure 10C:
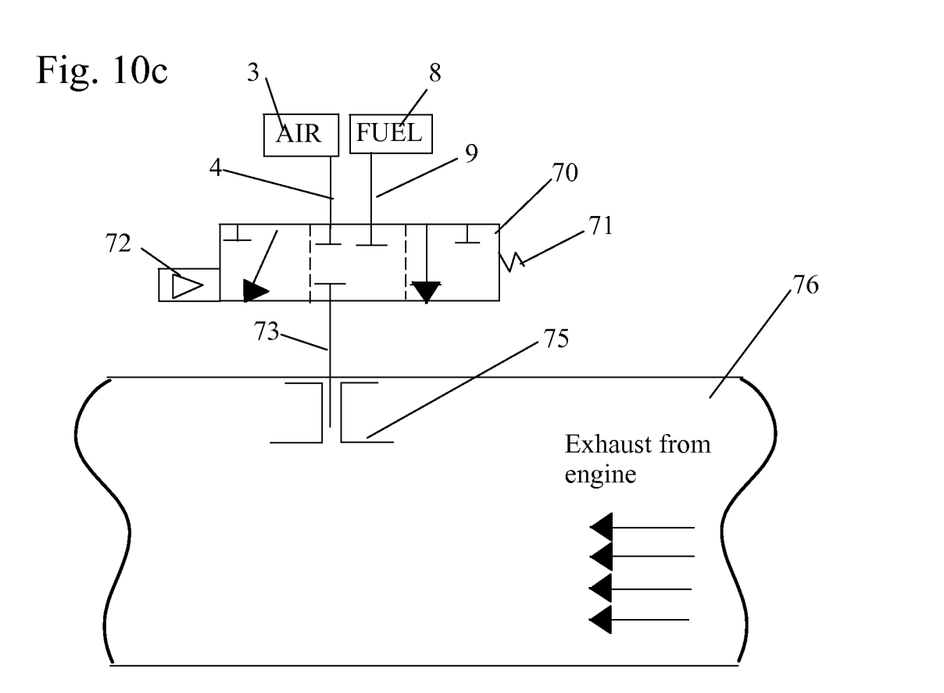

FIGS. 10a-10c show an exhaust after-treatment dosing system of a fifth embodiment. The exhaust after-treatment dosing system includes a single two position valve 70 that combines the air valve and fuel valve into a single valve and may be integrated into an injector with a nozzle 75 or remotely mounted in the engine compartment with the use of a line 73 between the valve 70 and an injector with a nozzle 75.

A supply of air 3 and fuel 8 are provided to the solenoid 72 controlled two position valve 70 through lines 4 and 9 respectively. The pressure of the air supply may be regulated or unregulated air. The air source is preferably from the vehicle, for example the air may be from turbo boost air or the air brake system. The fuel source is preferably from the vehicle fuel supply and dispenses pulses of fuel to the injector's nozzle 75. The valve 70 is connected to the injector's nozzle 75 through line 73. From the injector's nozzle 75, air or fuel is expelled into the engine exhaust system 76 of the engine.

In a first position of the two position valve 70, as shown in FIG. 10a, the solenoid 72 is "off" and the spring 71 moves the two position valve 70 to a position in which the fuel from fuel supply 3 is blocked from exiting line 9 and reaching line 73 leading to the injector nozzle 75. Air from the air supply 3 is allowed to flow from line 4 at a constant rate through the valve 70 to line 73 and the injector nozzle 75 to prevent injector coking from occurring.

When the solenoid 72 is turned "on" and the force of the solenoid 72 on the two position valve 70 is greater than the force of the spring 71, the two position valve 70 moves to a second position as shown in FIG. 10b. In the second position, air from the air supply 3 is blocked from exiting line 4 and reaching line 73 leading to the injector nozzle 75. Fuel from the fuel supply 8 is allowed to flow from line 9 at a constant rate through the valve 70 to line 73 and the injector nozzle 75.

With the pulsing of the solenoid controlled by a pulse width modulated (PWM) signal at varying or constant duty cycle at a varying or constant frequency from the ECU, the air pulses between each fuel pulse allowed through the two position valve 70 to the injector nozzle 75, aids in preventing injector nozzle coking and improves fuel atomization.

It should be noted that when the two position valve 70 moves from the first position to the second position, the supply of air 3 from line 4 to line 73 leading to the nozzle 75 is blocked prior to line 73 being open to receiving fuel from the fuel supply 8. Similarly, when the two position valve 70 moves from the second position to the first position, the supply of fuel 8 from line 9 leading to the nozzle 75 is blocked prior to line 73 being open to receiving air from the air supply 3.

The two position valve 70 also has a transitional or cross over position, as shown in FIG. 10c, in which the force of the solenoid 72 on one side of the valve 70 is equal to the spring force 71 on the opposite side of the valve. In this position, the supply of air 3 from line 4 and the supply of fuel 8 from line 9 are both blocked from line 73 leading to the injector nozzle 75. Ultimately, air continues to flow when the electrical signal to the solenoid is removed.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A system for purging orifice clogging due to coking of a device for injecting fuel into an exhaust system of an engine comprising:
   a device for injecting fuel into the exhaust system having an input, and an output coupled to an exhaust system;
   a first air valve having an input and an output;
   a second air valve having an input coupled to the output of the first air valve and an output coupled to the device through a first check valve;
   a volume coupled to the output of the first air valve and the input of the second air valve;
   at least one fuel valve separate from the at least one air valve, having an input coupled to a fuel supply and an output coupled to the device through a second check valve; and
   an air control valve having an inlet coupled to an air supply and an output coupled to the at least one fuel valve, the first air valve and the second air valve, wherein the air control valve uses air to actuate the at least one of first air valve, the second air valve, and the fuel valve;
   wherein when the first air valve is closed, the second air valve is open and the at least one fuel valve is closed, air flows from the volume to the device and is injected into the exhaust system of the engine through the output of the device;
   wherein when the second air valve is closed and the at least one fuel valve is open, fuel flows from the fuel supply to the device and is injected into the exhaust system of the engine through the output of the device.

2. The system of claim 1, wherein the device is a doser valve.

3. The system of claim 1, wherein the device is a nozzle in the exhaust system of the engine.

4. The system of claim 1, wherein pressure of the air supply is regulated.

5. The system of claim 1, wherein pressure of the fuel supply is regulated.

6. The system of claim 1, wherein the at least one air valve and the at least one fuel valve are controlled by a solenoid.

7. The system of claim 1, wherein when the first air valve is open, the second air valve is closed, and the fuel valve is open, air from the air supply flows into the volume.

\* \* \* \* \*